United States Patent [19]
Weisman et al.

[11] 4,258,388
[45] Mar. 24, 1981

[54] OPTICAL INDEXING SYSTEM

[75] Inventors: Irving H. Weisman, Flanders; Bernard Strauss, Rockaway, both of N.J.; David George, Park Forest; Harold Wakeley, Winnebago, both of Ill.

[73] Assignee: The United States of America as represented by the Secretary of the Army, Washington, D.C.

[21] Appl. No.: 8,675

[22] Filed: Feb. 2, 1979

[51] Int. Cl.³ .............................................. H04N 7/18
[52] U.S. Cl. .................................... 358/100; 358/108; 350/174
[58] Field of Search ................. 358/93, 100, 108, 225; 350/171, 172, 174; 354/221

[56] References Cited
U.S. PATENT DOCUMENTS

| 3,066,969 | 12/1962 | Camac | 358/100 |
| 3,075,113 | 1/1963 | Soar | 358/100 |
| 3,567,853 | 3/1971 | Green | 358/93 |
| 3,586,429 | 6/1971 | Cords, Jr. | 350/174 |
| 3,752,919 | 8/1973 | Qurashi et al. | 350/174 |

*Primary Examiner*—Robert L. Griffin
*Assistant Examiner*—Tommy P. Chin
*Attorney, Agent, or Firm*—Nathan Edelberg; Robert P. Gibson; Max Yarmovsky

[57] ABSTRACT

A T.V. camera, mounted on the arm of a teleoperator remotely controlled grasping hand, is used to view an object to be grasped through an in-line semi-reflective mirror and a laterally disposed reflective mirror. Alignment of the teleoperator with the object is indicated by a single superimposed image of the object on the television viewing screen. Non-alignment of the teleoperator hand and the object is indicated by double images.

9 Claims, 4 Drawing Figures

U.S. Patent     Mar. 24, 1981     4,258,388
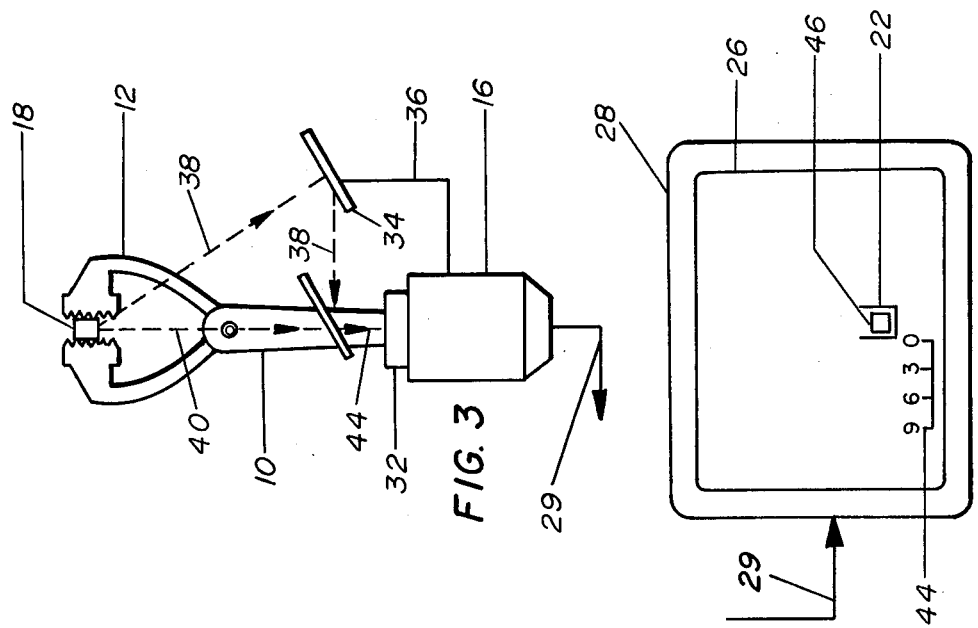
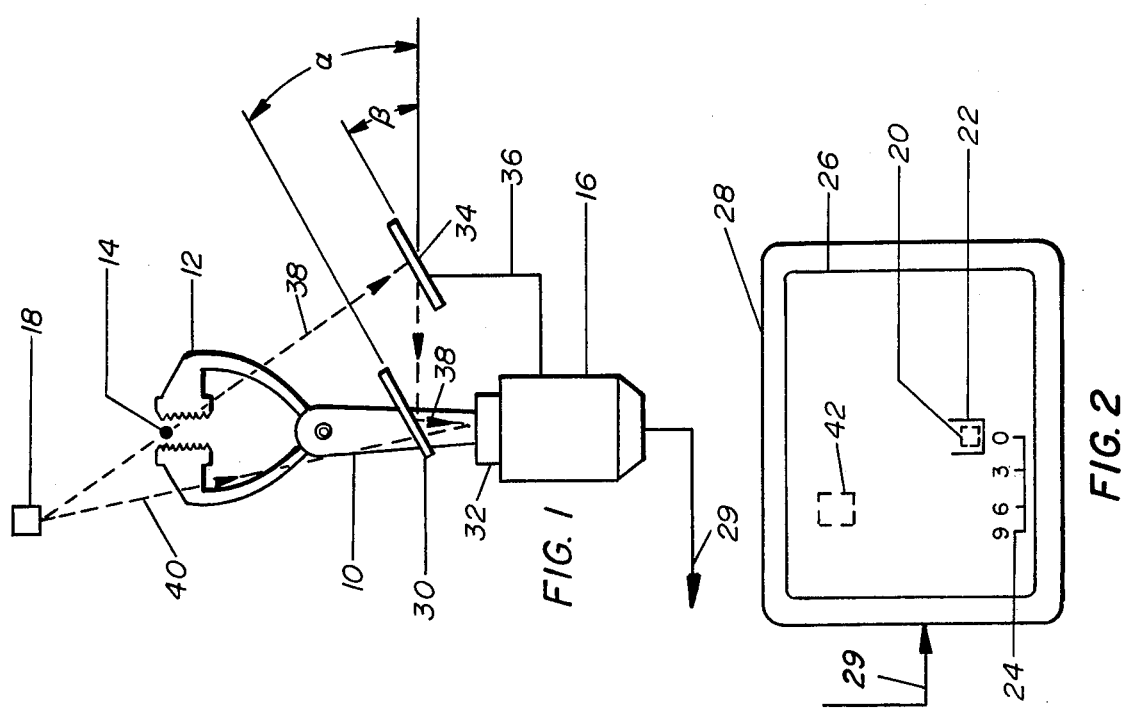

OPTICAL INDEXING SYSTEM

GOVERNMENTAL INTEREST

The invention described herein was made in the course of a contract with the Government and may be manufactured, used and licensed by or for the Government for governmental purposes without the payment to us of any royalty thereon.

BACKGROUND OF THE INVENTION

Various means have been used in the prior art to control the position of remotely controlled mechanical hands. Two-dimensional television monitors have frequently been used in the past to view the object to be grasped in order to increase the distance between the operator and hazardous material being handled and thereby minimize the risk of injury to an operator. The problem with the use of teleoperators (remotely controlled mechanical hands) has been the difficulty in determining the exact location of the object to be grasped when being viewed through a two dimensional viewing television monitor. In some instances three-dimensional TV systems have been used in order to provide some depth of field perception to the operator. However, the increased cost of multi-television camera systems and the mobility restrictions placed upon the operator have greatly limited their use. Another problem with multi-TV approach is the requirement that the operator view the field through a special viewer which then restricts the operator from observing any other operation.

SUMMARY OF THE INVENTION

The present invention relates to an optical indexing system for accurately locating a teleoperator with respect to an object to be grasped. The optical system of the present device is fixedly attached to the teleoperator arm. A television camera is operatively positioned to view the object through a combination of an in-line, direct view semi-reflective mirror, and a laterally disposed reflective mirror. When a direct view image of the object, as seen in the TV camera viewer coincides with a reflected image of the object, the operator recognizes the hand may grasp the object.

An object of the present invention is to provide an optical indexing system for a teleoperator locating device which enhances an operator's depth perception of an object relative to the grasping hand of a teleoperator.

Another object of the present invention is to provide an optical indexing system for a teleoperator which does not require the use of expensive three-dimensional television viewing systems.

Another object of the present invention is to provide an optical indexing system for a teleoperator which does not unduly restrict an operator from using his eyes for any other operation.

A further object of the present invention is to provide an inexpensive system for locating the distance from a teleoperator to a first object in order to enable accurate alignment of the teleoperator.

For a better understanding of the present invention, together with other and further objects thereof, reference is made to the following descriptions taken in connection with the accompanying drawings.

BRIEF DESCRIPTION OF THE DRAWINGS

FIG. 1 is a schematic view of an optical indexing system of the teleoperator when the object is at a distance beyond the teleoperator's set point.

FIG. 2 is a schematic view of a television monitor screen showing non-superimposed images of the object and the set point of the teleoperator when the object is beyond the setpoint as shown in FIG. 1.

FIG. 3 is a schematic view of an optical indexing system of the teleoperator when the object to be grasped is correctly positioned within the teleoperator's hand.

FIG. 4 is a schematic view of a television monitor screen showing how superimposed images are viewed when the object to be grasped is properly positioned within the teleoperator.

Throughout the following description like reference numerals are used to denote like parts of the drawings.

DESCRIPTION OF THE PREFERRED EMBODIMENTS

Referring now to FIGS. 1-4 a remotely controlled teleoperator arm member 10 has a pivotally attached remotely controlled hand 12 on one end which has a setpoint 14 centrally located therein. A television (TV) camera 16 is fixedly attached to the other end of arm 10 and aligned with respect to set point 14 such that when an object 18 is positioned at set point 14 it will appear as a first reference image 20 within a position indicating reference frame 22. Reference frame 22 is made to the size of the object being viewed. Range markings 24, and reference frame 22 may be inscribed directly on a transparent mask 26 which is placed in front of a video monitor 28, or it may be directly marked on the screen of a video monitor 28. Monitor 28 is electrically coupled to the output of TV camera 16 by a conductor 29. A semi-reflective, semi-transparent plane surface mirror 30 is fixedly positioned at an inclined angle $\alpha$ in front of a viewing lens 32 of TV camera 16. TV camera 16 is operatively focused on object 18 and hand 12. A fully reflective plane surface mirror 34 is laterally disposed and inclined at an angle $\beta$ with respect to lens 32 of TV camera 16. Plane mirror 34 is fixedly attached to TV camera 16 by means of structural member 36. Plane mirror 34 is inclined at an angle $\beta$ to permit the reflected light from object 18, as represented by dash lines 38, to be indirectly viewed by a first light path by TV camera 16 simultaneously with the direct viewing of the object 18, via the reflected second light path 40, as seen by the TV camera 16. The second light path 40 from the object 18 is viewed directly through the semi-transparent, semi-reflective plane mirror 30 and is indicated on FIG. 2 as the second reference image 42 of the object 18.

In operation, the teleoperator assembly, as shown in FIG. 1, is moved by an operator while the operator observes the distance between the first and second images 20 and 42 respectively as seen on monitor screen 28. FIG. 1 shows the object 18 at a distance beyond the set point 14. When object 18 position is as shown in FIG. 1, second image 42 will appear to the left and above first image 20. The range scale 24 will enable the operator to estimate the relative distance and direction that he has to move arm 10. In order for an operator to bring the set point 14 to the object 18 so that the latter may be grasped by teleoperator hands 12, as shown in FIG. 3, the whole assembly must be moved until the first and second reference images 20 and 42 respectively are superimposed upon one another within reference frame 22, as illustrated in FIG. 4. When the object 18 is in proper position for grasping, as shown in FIG. 3, the TV camera 16 sees only one image of the object because the light path 38 reflected from mirrors 34 and 30 becomes coincident with light path 40 direct from object 18 passing through semitransparent mirror 30. The coincident combined light is represented by a dash line 44 and superimposed image 46.

While there has been described and illustrated specific embodiments of the invention, it will be obvious that various changes, modifications and additions can be made herein without departing from the field of the invention which should be limited only by the scope of the appended claims.

What is claimed is:

1. An optical indexing system for teleoperator locating which comprises:
   remotely controlled grasping means for holding an object therein and for grasping said object when said object is located at a set point in said grasping means;
   television camera means, fixedly attached to said remotely controlled grasping means, for simultaneously viewing said object in three dimensions;
   first mirror means operatively disposed and fixedly positioned in front of said television camera means for transmitting light from said object to said television camera means through a plurality of light paths;
   second mirror means operatively disposed fixedly attached to said camera means with respect to said first mirror means for reflecting light from said object to said first mirror means, which includes;
   a fully reflective single plane surface mirror; and
   video monitor means electrically coupled to an output of said television camera means for displaying images transmitted by said first and second mirror means to said camera means, said video monitor means showing two separate images of said object when said object is not located at said set point of said grasping means and showing a single image of said object when said object is located at said set point.

2. A system as recited in claim 1 wherein said grasping means comprises a remotely controlled arm having a remotely controlled hand pivotally attached on one end of said remotely controlled arm.

3. A system as recited in claim 1 wherein said television camera means has a viewing lens disposed intermediate said first mirror means and said television camera means, said viewing lens operatively focused on said object and said grasping means.

4. A system as recited in claim 3 wherein said first mirror means comprises a semi-transparent and semi-reflecting plane mirror.

5. A system as recited in claim 4 wherein said first mirror means comprises a semi-transparent and semi-reflecting plane surface mirror fixedly positioned at an inclined angle $\alpha$ in front of said viewing lens of said television camera means.

6. A system as recited in claim 1 wherein said second mirror means comprises a fully reflective plane surface mirror fixedly disposed at an inclined angle $\beta$ with respect to said viewing lens of said television camera means.

7. A system as recited in claim 1 wherein said video monitor means comprises a screen having a position indicating reference frame and range scale markings thereon.

8. A system as recited in claim 7 wherein said plurality of light paths includes a first light path from said object reflected by said second mirror means toward said first mirror means and in turn reflected into said viewing lens of said television camera, said first light path generating a first reference image on said screen of said video monitor means.

9. A system as recited in claim 8 wherein said plurality of light paths includes a second light path from said object transmitted through said first mirror means into said viewing lens, said second light path generating a second reference image on said screen of said video monitor means, wherein when said first and second reference images are superimposed upon each other within said position indicating reference frame of said screen said object is in position for proper grasping by said remotely controlled grasping means.

* * * * *